US009416665B2

United States Patent
Xu et al.

(10) Patent No.: US 9,416,665 B2
(45) Date of Patent: Aug. 16, 2016

(54) COOLING HOLE WITH ENHANCED FLOW ATTACHMENT

(75) Inventors: JinQuan Xu, Groton, CT (US); Glenn Levasseur, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 943 days.

(21) Appl. No.: 13/544,074

(22) Filed: Jul. 9, 2012

(65) Prior Publication Data
US 2013/0209233 A1    Aug. 15, 2013

Related U.S. Application Data

(60) Provisional application No. 61/599,370, filed on Feb. 15, 2012.

(51) Int. Cl.
*F01D 5/18* (2006.01)
*F01D 9/06* (2006.01)

(52) U.S. Cl.
CPC ............... *F01D 5/186* (2013.01); *F01D 9/065* (2013.01); *F05D 2240/81* (2013.01); *F05D 2260/202* (2013.01); *F23R 2900/03042* (2013.01); *Y02T 50/676* (2013.01)

(58) Field of Classification Search
CPC .............................................. F05D 2250/611
USPC ........................................................ 415/914
See application file for complete search history.

(56) References Cited

U.S. PATENT DOCUMENTS

| 4,197,443 | A | 4/1980 | Sidenstick |
| 4,529,358 | A | 7/1985 | Papell |
| 4,622,821 | A | 11/1986 | Madden |
| 4,653,279 | A | 3/1987 | Reynolds |
| 4,653,983 | A | 3/1987 | Vehr |
| 4,672,727 | A | 6/1987 | Field |
| 4,684,323 | A | 8/1987 | Field |
| 4,700,544 | A | 10/1987 | Fucci |

(Continued)

FOREIGN PATENT DOCUMENTS

| EP | 1262631 A2 | 12/2002 |
| EP | 1326007 A2 | 7/2003 |

(Continued)

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Richard Edgar
*Assistant Examiner* — Jeffrey A Brownson
(74) *Attorney, Agent, or Firm* — Kinney & Lange, P. A.

(57) ABSTRACT

A gas turbine engine component includes a wall having first and second wall surfaces, a cooling hole extending through the wall and a convexity. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section and a second lobe adjacent the first lobe and diverging longitudinally and laterally from the metering section. The convexity is located near the outlet.

16 Claims, 9 Drawing Sheets

(56) References Cited

U.S. PATENT DOCUMENTS

| | | |
|---|---|---|
| 4,738,588 A | 4/1988 | Field |
| 5,062,768 A | 11/1991 | Marriage |
| 5,096,379 A | 3/1992 | Stroud et al. |
| 5,129,231 A | 7/1992 | Becker et al. |
| 5,252,026 A | 10/1993 | Shepherd |
| 5,326,224 A | 7/1994 | Lee et al. |
| 5,358,374 A | 10/1994 | Correia et al. |
| 5,382,133 A | 1/1995 | Moore et al. |
| 5,418,345 A | 5/1995 | Adamski |
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,814,529 B2 * | 8/2014 | Fiala et al. ............... 416/236 R |
| 2001/0036401 A1 | 11/2001 | Harvey et al. |
| 2002/0159888 A1 | 10/2002 | Rinck et al. |
| 2004/0265488 A1 | 12/2004 | Hardwicke et al. |
| 2005/0106020 A1 | 5/2005 | Bunker et al. |
| 2005/0286998 A1 | 12/2005 | Lee et al. |
| 2006/0163211 A1 | 7/2006 | Pietraszkiewicz et al. |
| 2008/0003096 A1 * | 1/2008 | Kohli et al. ................ 415/115 |
| 2008/0145208 A1 | 6/2008 | Klasing et al. |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0068068 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2011/0311369 A1 * | 12/2011 | Ramachandran et al. .. 416/97 R |
| 2012/0051941 A1 | 3/2012 | Bunker |
| 2012/0167389 A1 | 7/2012 | Lacy et al. |

FOREIGN PATENT DOCUMENTS

| | | |
|---|---|---|
| EP | 1609949 A1 | 12/2005 |
| JP | 2008248733 A | 10/2008 |

OTHER PUBLICATIONS

International Search Report and Written Opinion, dated Nov. 4, 2013, for PCT Application No. PCT/US2013/025684, 12 pages.

European Patent Office, the extended European search report, Nov. 27, 2015, 8 pages.

* cited by examiner

COOLING HOLE WITH ENHANCED FLOW ATTACHMENT

CROSS-REFERENCE TO RELATED APPLICATIONS

This application claims priority to U.S. Provisional Application No. 61/599,370, filed on Feb. 15, 2012 and entitled "COOLING HOLE WITH ENHANCED FLOW ATTACHMENT", the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a wall having first and second wall surfaces, a cooling hole extending through the wall, and a convexity. The cooling hole includes an inlet located at the first wall surface, an outlet located at the second wall surface, a metering section extending downstream from the inlet and a diffusing section extending from the metering section to the outlet. The diffusing section includes a first lobe diverging longitudinally and laterally from the metering section and a second lobe adjacent the first lobe and diverging longitudinally and laterally from the metering section. The convexity is located near the outlet.

A wall of a component of a gas turbine engine includes first and second wall surfaces, an inlet located at the first wall surface, an outlet located at the second wall surface, a metering section commencing at the inlet and extending downstream from the inlet, a diffusing section extending from the metering section and terminating at the outlet and a convexity located on the second wall surface downstream of the outlet. The diffusing section includes a first lobe diverging longitudinally and laterally from the metering section and a second lobe adjacent the first lobe and diverging longitudinally and laterally from the metering section.

DETAILED DESCRIPTION

Figure 1:
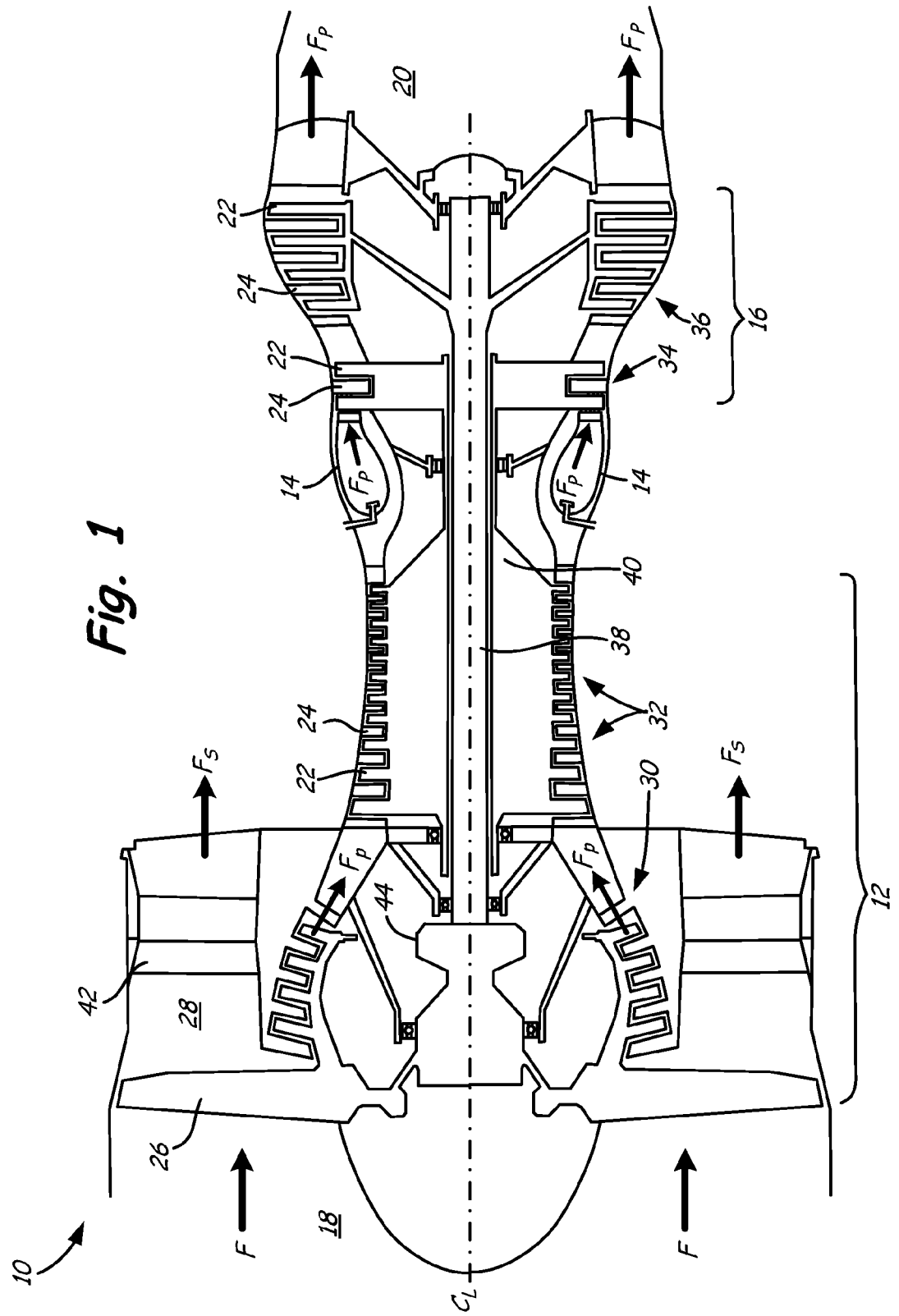
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but are not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow Fp and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but not limited to, cooled gas turbine engine components in compressor sections 30 and 32, combustor 14, turbine sections 34 and 36, and exhaust section 20 of gas turbine engine 10.

Figure 2A:
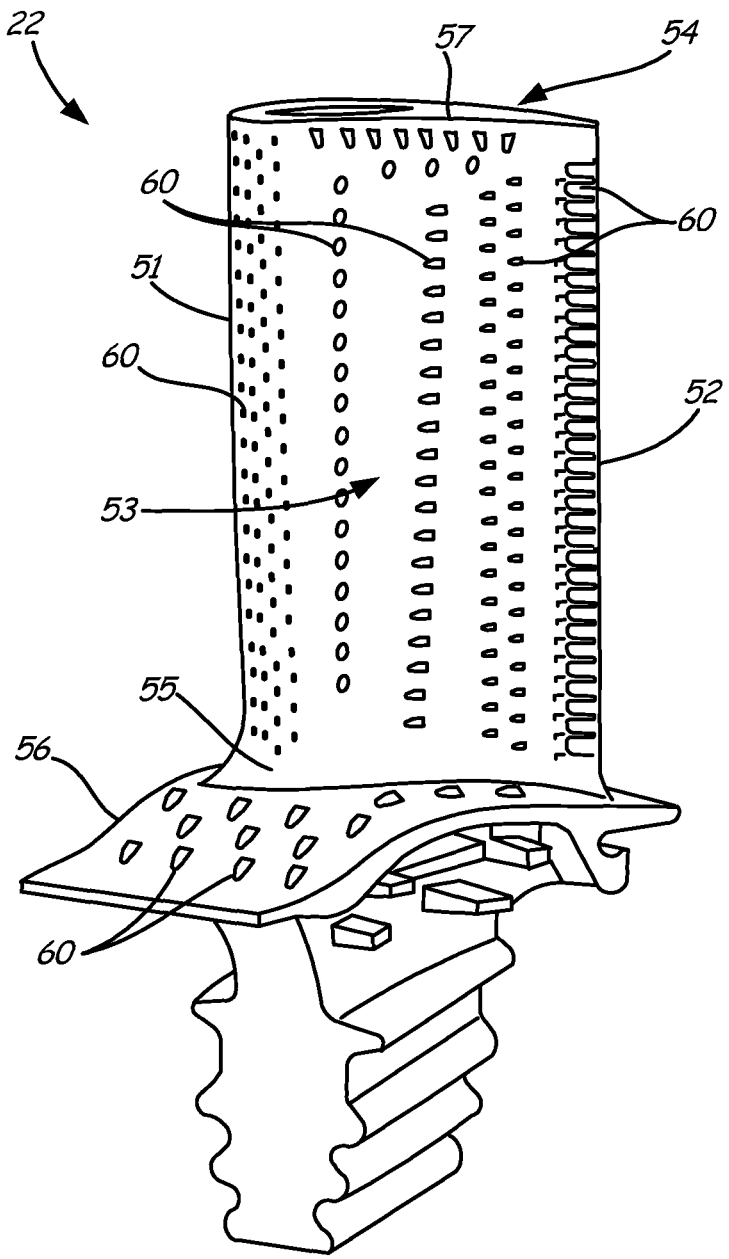
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
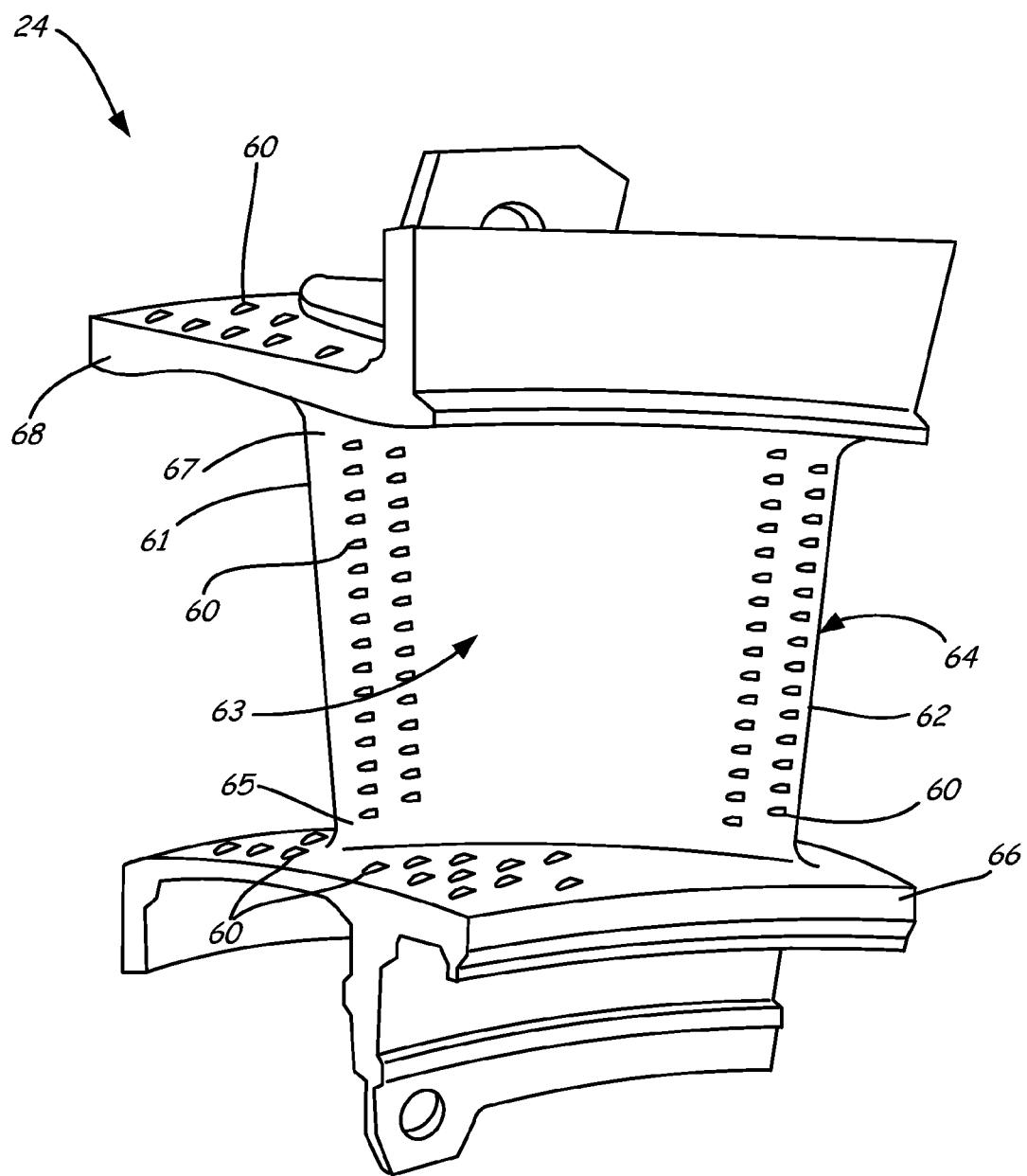
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The gas turbine engine components and walls described herein provide a cooling solution that offers improved film cooling coverage and eliminates or reduces the problems associated with conventional diffusion film cooling holes, such as flow separation and blow off. Multi-lobed cooling holes are coupled with a downstream flow attachment feature, an undulation on the wall surface. The described multi-lobed cooling holes and undulation provide a cooling arrangement that offers improvements over the state of the art. Multi-lobed cooling holes provide improved film effectiveness and reduce the likelihood of film separation so that they work as intended at high blowing ratios and reduce the detrimental effects of kidney vortices. The downstream undulation helps promote flow attachment of the cooling film to the component wall surface further minimizing mixing of the cooling flow with high temperate gases. Together, these features offer improved cooling solutions for components in the hot gas path.

Figure 3:
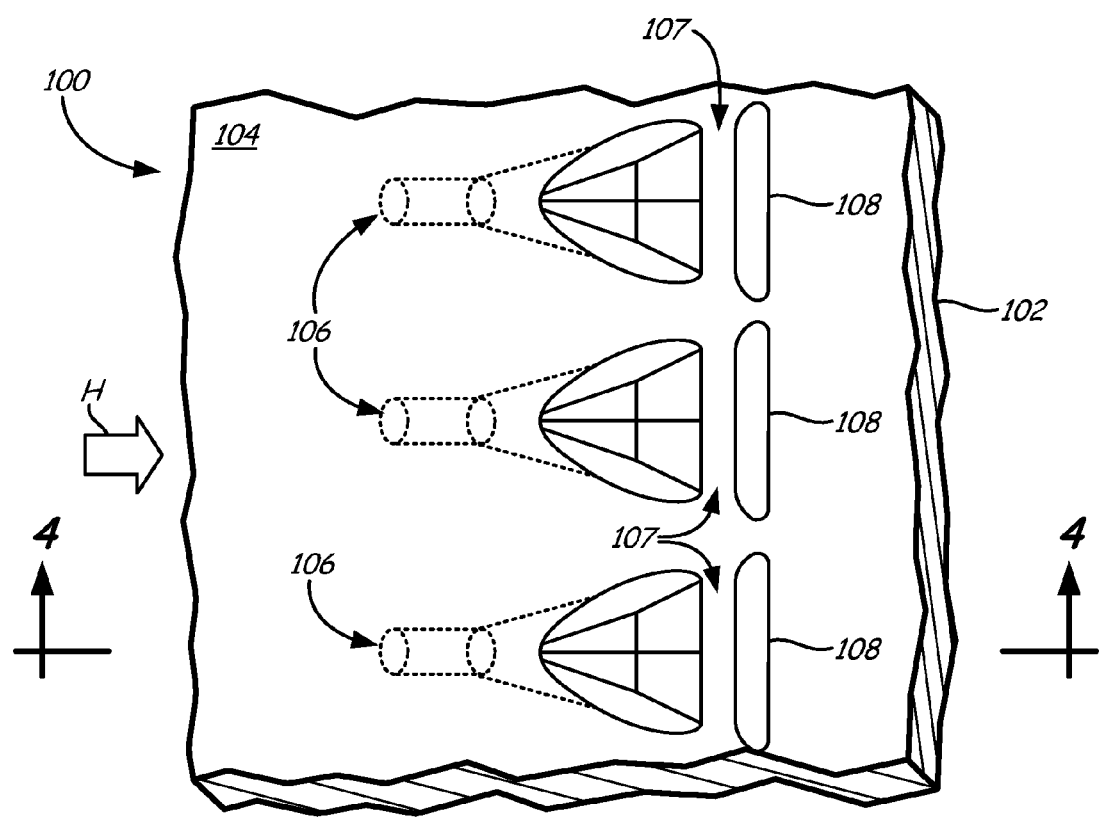
FIG. 3 is a view of a wall having cooling holes with enhanced flow attachment.

Gas turbine engine components exposed to hot gas flow typically include a wall in which film cooling may be utilized. FIG. 3 illustrates a view of a wall of a gas turbine engine component having multi-lobed film cooling holes and undulations. Wall 100 includes first wall surface 102 and second wall surface 104. As described in greater detail below, wall 100 is primarily metallic and second wall surface 104 can include a thermal barrier coating. Multi-lobed film cooling holes 106 are oriented so that their inlets are positioned on the first wall surface 102 and their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104.

As described below in greater detail, cooling air flows out of cooling holes 106 and flows through each of the lobes in the diffusing section. Cooling holes 106 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in the same direction as the high temperature gases flowing along second wall surface 104 (represented by arrow H). Here, the linear row of cooling holes 106 is substantially perpendicular to the direction of flow H. In alternate embodiments, the orientation of cooling holes 106 can be arranged on second wall surface 104 so that the flow of cooling air is substantially perpendicular to the high temperature gas flow (i.e. cooling air exits cooling holes 106 radially) or at an angle between parallel and perpendicular. Cooling holes 106 can also be provided in a staggered formation or other formations on wall 100. Cooling holes 106 can be located on walls of a variety of components that require cooling. Suitable components include, but are not limited to, turbine vanes and blades, combustors, blade outer air seals, augmentors, etc. Cooling holes 106 can be located on the pressure side or suction side of vanes and blades. Cooling holes 106 can also be located on the blade tip or blade or vane platforms.

Figure 4:
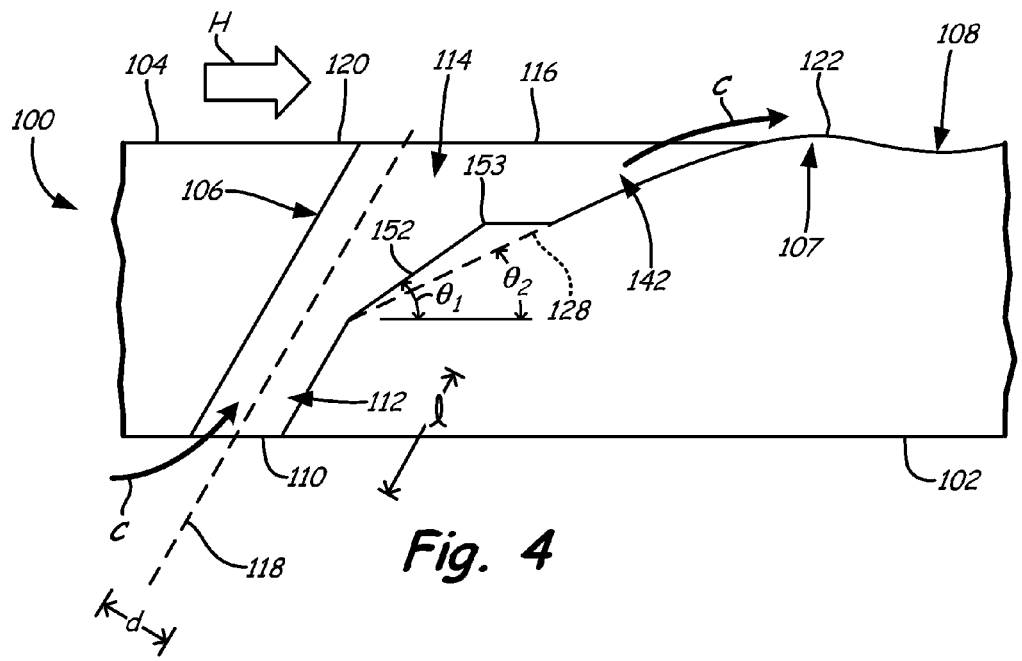
FIG. 4 is a sectional view of the cooling hole of FIG. 3 taken along the line 4-4.

Wall 100 also includes undulations, which include convexities 107 and indentations 108. Indentations 108 are located downstream from convexities 107; both are downstream from cooling holes 106. As described in greater detail below, indentations 108 are depressions, troughs, grooves, channels or concavities in the surface of second wall surface 104. Indentation 108 forms part of an undulation to aid in flow attachment. Each undulation includes a convex shape and a concave shape. As shown in FIG. 4, convexity 107 serves as the convex shape and indentation 108 serves as the concave shape.

Figure 5:
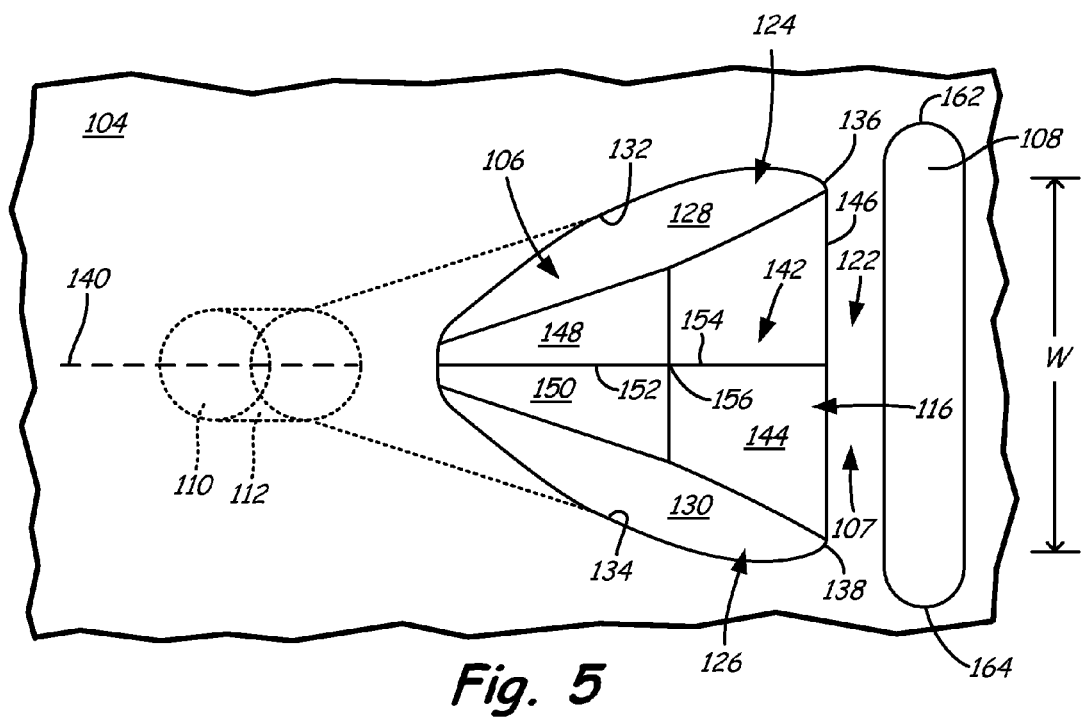
FIG. 5 is a view of the cooling hole of FIG. 4 taken along the line 5-5.

FIGS. 4 and 5 illustrate one embodiment of wall 100 in greater detail. FIG. 4 illustrates a sectional view of wall 100 of FIG. 3 taken along the line 4-4 and showing multi-lobed cooling hole 106 and the undulation (convexity 107 and indentation 108). Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical), racetrack (oval with two parallel sides having substantially straight portions) or crescent shaped or other shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d. In alternate embodiments, metering section 112 has an oblong or racetrack-shaped or other shaped cross section. As oblong and racetrack configurations are not circular, their metering sections 112 have a length l and hydraulic diameter $d_h$. In some embodiments, metering section 112 has a length l according to the relationship: $d_h \leq l \leq 3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118. Longitudinal axis 118 represents the angle of metering section 112 between first wall surface 102 and second wall surface 104.

Diffusing section 114 is adjacent to and downstream from metering section 112. Cooling air C diffuses within diffusing section 114 before exiting cooling hole 106 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses in diffusing section 114 as it flows towards outlet 116.

As shown best in FIG. 5, diffusing section 114 includes two channel-like lobes 124 and 126. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (side walls 132 and 134, respectively) and a trailing edge (trailing edges 136 and 138, respectively). FIG. 4 best illustrates the longitudinal divergence (from longitudinal axis 118), while FIG. 5 best illustrates the lateral divergence (from centerline axis 140). As shown in FIG. 5, first lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126. In cooling hole 106, first lobe 124 and second lobe 126 extend to outlet 116 at second wall surface 104 (best seen in FIG. 5).

In some embodiments, like that shown in FIG. 5, diffusing section 114 also includes interlobe region 142. Multi-lobed cooling holes having interlobe region 142 are described in greater detail in the U.S. Provisional Application No. 61/599,372 filed on Feb. 15, 2012 and entitled "MULTI-LOBED COOLING HOLE AND METHOD OF MANUFACTURE", which is incorporated by reference. As shown in FIG. 5, portion 144 of interlobe region 142 is located between first lobe 124 and second lobe 126. End 146 of interlobe region 142 is adjacent outlet 116 where the outlet meets second wall surface 104. In the embodiment shown in FIG. 5, portion 144 of interlobe region 142 has a trapezoidal shape and extends from end 146 towards metering section 112.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form ridge 152 as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106. As shown in FIG. 5, ridge 152 is coincident with centerline axis 140 (i.e. centerline axis 140 lies atop ridge 152).

Interlobe region 142 has a compound trapezoidal shape as ridge 154 separates interlobe region 142 into two sides having surfaces in two different planes. In this embodiment, interlobe region 142 includes ridge 154 laterally bisecting interlobe region 142. Ridge 154 converges with bottom surface 130 of second lobe 126 at outlet 116 at second wall surface 104 as shown in FIG. 4. The intersection of ridges 152 and 154 at the point where interlobe region 142 meets first inclined portion 148 and second inclined portion 150 forms apex 156. By forming apex 156 upstream of outlet 116, diffusing section 114 facilitates improved flow attachment.

Adding interlobe region 142 to diffusing section 114 improves the thermo-mechanical fatigue tolerance of multi-lobed film cooling hole 106. Without interlobe region 142, the trailing edge of cooling hole 106 (where outlet 116 and second wall surface 104 meet) would include sharp edges or corners at the trailing edge of ridge 152 and at trailing edges 136 and 138 of lobes 124 and 126. These sharp edges and corners are highly susceptible to thermo-mechanical fatigue. Over time, cracks develop in these areas due to the temperature cycling that occurs during operation. These cracks further reduce cooling effectiveness and performance and will eventually lead to failure, requiring replacement or repair of the affected component. Replacing and repairing components is costly both in terms of materials and in aircraft downtime. By incorporating interlobe region 142 to diffusing section 114, the previously sharp edges and corners are blended into smoother transitions that are less susceptible to thermo-mechanical fatigue. Additionally, the smoother transitions near ridge 152 and trailing edges 136 and 138 reduces the likelihood that cooling air C will "jet off" instead of forming a cooling film along second wall surface 104.

Figure 6:
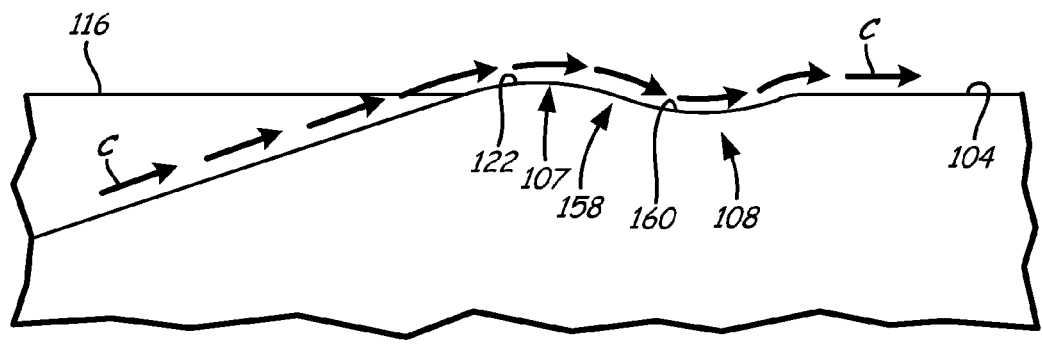
FIG. 6 is an enlarged view of the outlet and flow enhancement feature of FIG. 4.

As noted above, the undulation described by the present invention includes a convex shape and a concave shape. Downstream end 122, portion 144 of interlobe region 142 and/or bottom surfaces 128 and 130 serve as at least portion of the convex portion of the undulation, while indentation 108 serves as the concave portion. The undulation formed by downstream end 122, portion 144 and/or bottom surfaces 128 and 130 and indentation 108 further reduces the likelihood that cooling air C will "jet off" and encourages formation of a cooling film along second wall surface 104 due to the Coanda effect. The Coanda effect is the tendency of a fluid jet to be attracted to a nearby curved surface. In order for the Coanda effect to occur, the surface along which the fluid jet is flowing requires at least a convexity. In other embodiments, an undulation, having a convexity and a concavity, is present. Convexity 107 (shown best in FIGS. 4 and 6) is formed along the bottom of diffusing section (portion 144 and/or bottom surfaces 128 and 130) and/or downstream end 122 of second wall surface 104. Indentation 108 serves as a concavity. Indentation 108 is a depression, trough, groove, channel or concavity in the surface of second wall surface 104. Due to the undulation (wavy feature) created by convexity 107 and indentation 108, the flow of cooling air C exiting outlet 116 is directed towards second wall surface 104. FIG. 6 illustrates an enlarged view of convexity 107 and indentation 108 on second wall surface 104 and shows a path taken by cooling air C (arrows) because of the Coanda effect. Encouraging the flow of cooling air C along this contoured surface causes cooling air C to "attach" to second wall surface 104 and form a film of cooling air instead of "blowing off" or "jetting off" second wall surface 104.

Indentation 108 can take various forms. In exemplary embodiments, indentation 108 is concave with a rounded, fluidly smooth contour to encourage flow attachment. In some embodiments, indentation 108 has a circular arc along second wall surface 104, the arc extending towards first wall surface 102. In alternate embodiments, indentation 108 has an elliptical arc along second wall surface 104, the arc extending towards first wall surface 102. Indentation 108 is generally aligned so that its axis in the lateral direction is parallel to the trailing edge of outlet 116 or perpendicular to the direction of cooling flow.

To receive the most benefit from the Coanda effect and encourage flow attachment of cooling air C along second wall surface 104, convexity 107 (and indentation 108, when present) must be located near outlet 116. If outlet 116 and indentation 108 are separated by too large of a distance, indentation 108 will be less able to reduce cooling air blow off. In some embodiments, the distance between outlet 116 and indentation 108 along second wall surface 104 is larger than the distance between inner wall surface 12 and second wall surface 104.

The (longitudinal) length of indentation 108 and convexity 107 (formed by diffusing section 114 and downstream end 122 of second wall surface 104) can vary. The velocities of cooling air C and the high temperature gases are used to determine appropriate lengths of indentation 108 and convexity 107. In some embodiments, indentation 108 has a longitudinal length that is substantially equal to the longitudinal length of convexity 107.

Figure 7A:
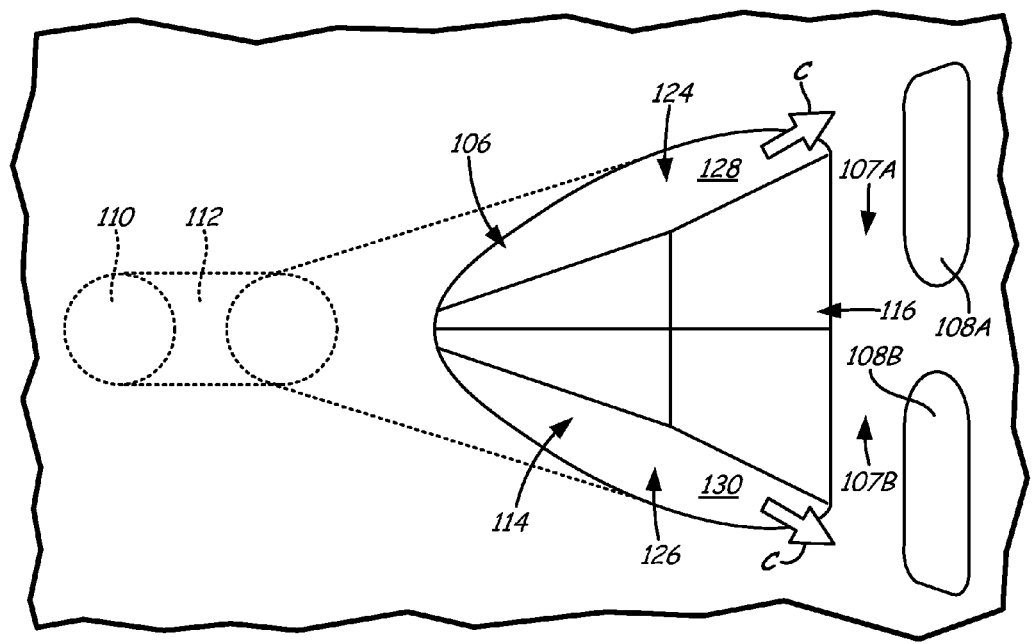
FIG. 7A is a view of one embodiment of a wall having a cooling hole with enhanced flow attachment.
Figure 7B:
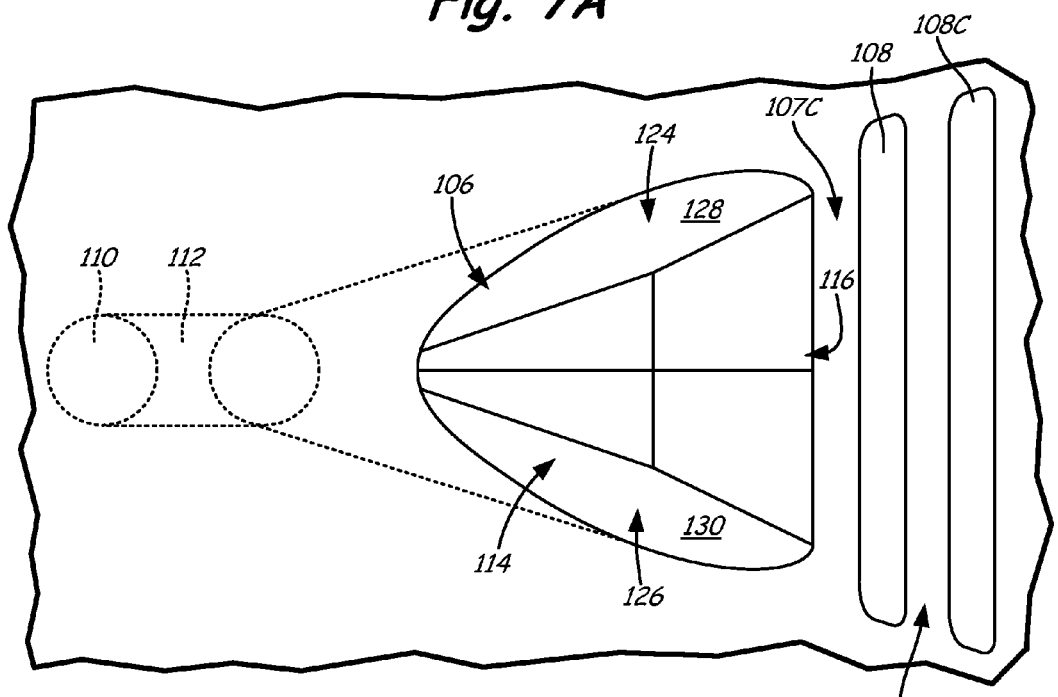
FIG. 7B is a view of another embodiment of a wall having a cooling hole with enhanced flow attachment.

The lateral width (indicated by W in FIG. 5) of convexity 107 can vary. Lateral width W represents the width of convexity 107. Convexity 107 extends the length of the trailing edge of cooling hole 106. The lateral width of indentation 108 can also vary. As shown in FIG. 5, indentation 108 includes first end 162 and second end 164. In some embodiments, such as that shown in FIG. 5, lateral width W of convexity 107 is less than the distance between first end 162 and second end 164 of indentation 108. In some embodiments, indentation 108 will have a lateral width between about 100% and about 150% of lateral width W of convexity 107. In some embodiments, the magnitude of the lateral width of indentation 108 depends on the distance between outlet 116 and indentation 108. For example, indentations 108 that are farther from outlet 116 can have larger lateral widths to ensure that a majority of cooling air C exiting outlet 116 encounters the concavity formed by indentation 108. In alternate embodiments, convexity 107 has a greater lateral width W, greater than or equal to the distance between first end 162 and second end 164. In some embodiments, the lateral width of indentation 108 depends on the distance between indentation 108 and outlet 116. As shown in FIG. 7B, the lateral widths of indentations 108 and 108C generally correspond with the degree of lateral divergence within diffusing section 114.

Convexity 107 and indentation 108 can be laterally continuous or segmented. FIG. 7A illustrates an embodiment of cooling hole 106 having two indentation segments. Convexity 107A and indentation 108A are aligned with and located downstream from first lobe 124. Convexity 107B and indentation 108B are aligned with and located downstream from second lobe 126. Indentations 108A and 108B align cooling air C flowing through first and second lobes 124 and 126, respectively, with the high temperature gases. Embodiments of this type can be useful if cooling hole 106 is located in a curved wall 100, such as a contoured turbine endwall or a corner of a component.

Multiple undulations (convexity 107 combined with indentation 108) can be located on second wall surface 104 along the air flow path. A second undulation can be located downstream of a first undulation. FIG. 7B illustrates an embodiment of cooling hole 106 having two undulations (convexity 107C and indentation 108 and convexity 107D and indentation 108C). Indentation 108 is located downstream from outlet 116 and convexity 107C as described above. Indentation 108C is located downstream from indentation 108 and convexity 107D to create a series of undulations. In this embodiment, diffusing section 114 and downstream end 122 of second wall surface 104 form first convexity 107C, while indentation 108 serves as the concavity. A downstream portion of indentation 108 and second wall surface 104 form a second convexity (107D), while indentation 108C serves as the second concavity.

Figure 7C:
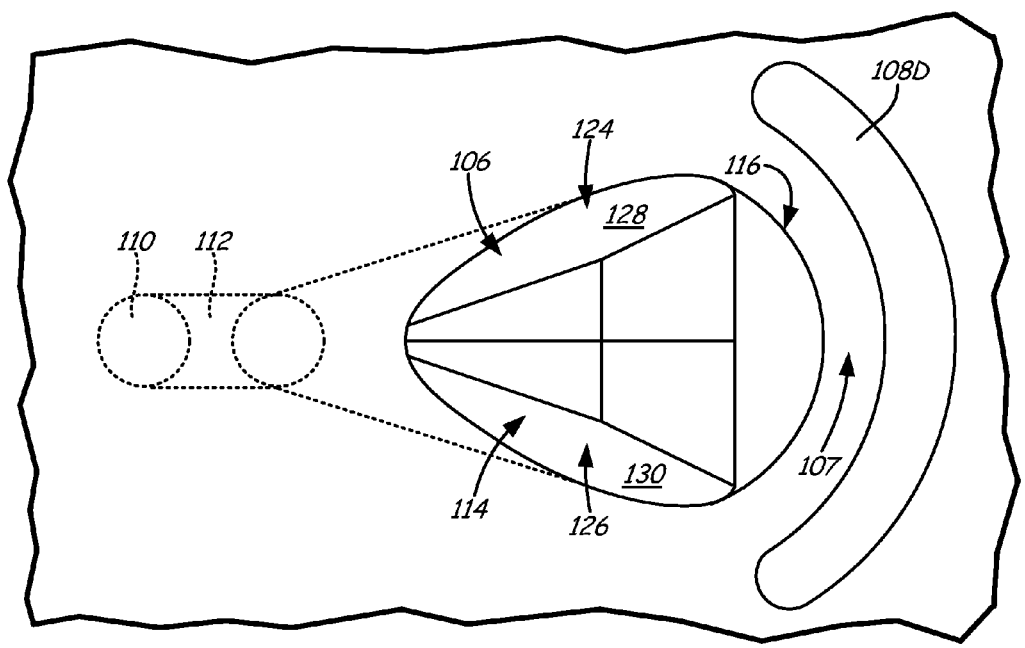
FIG. 7C is a view of another embodiment of a wall having a cooling hole with enhanced flow attachment.
Figure 7D:
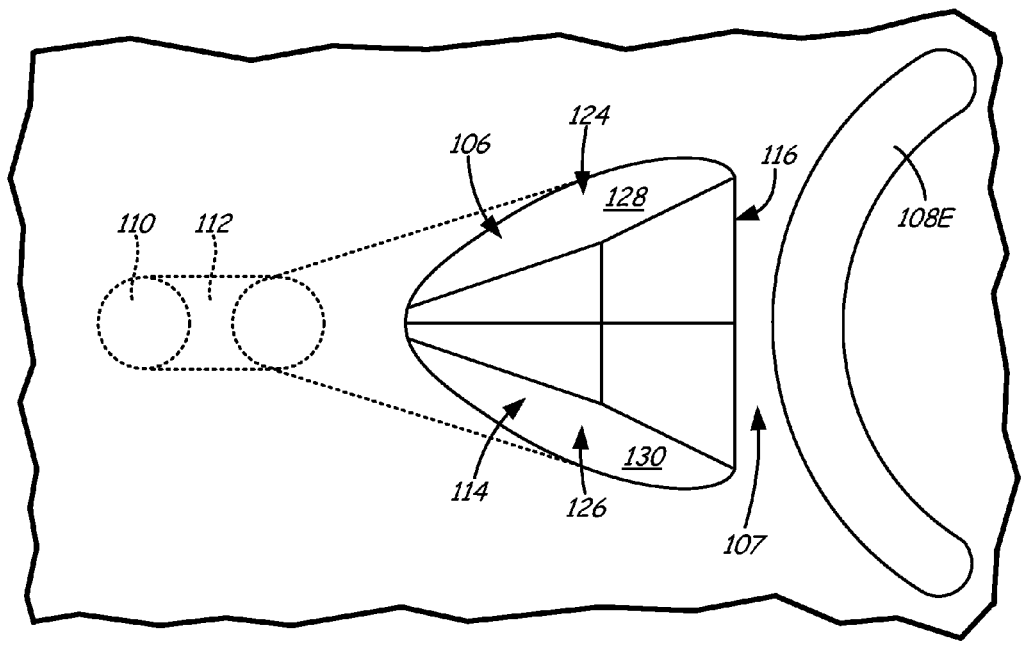
FIG. 7D is a view of another embodiment of a wall having a cooling hole with enhanced flow attachment.

Convexity 107 and indentation 108 can also be concave or convex relative to the flow of cooling air C through outlet 116. FIG. 7C illustrates an embodiment of cooling hole 106 having a concave convexity (107) and concave indentation relative to the flow of the cooling air. Indentation 108D is located downstream from outlet 116 and concave relative to the flow of cooling air C. The trailing edge of outlet 116 can be curved as shown in FIG. 7C to match concave indentation 108D. Alternatively, the trailing edge of outlet 116 can be straight or have other geometry. FIG. 7D illustrates an embodiment of cooling hole 106 having a convex indentation relative to the flow of the cooling air. Indentation 108E is located downstream from outlet 116 and convex relative to the flow of cooling air C. The trailing edge of outlet 116 can be straight as shown in FIG. 7D. Alternatively, the trailing edge of outlet 116 can be curved to match convex indentation 108E or have other geometry.

FIGS. 3, 4 and 5 illustrate cooling hole 106 having interlobe region 142. In some embodiments, cooling hole 106 does not include interlobe region 142. Instead, diffusing section 114 can have a more conventional (straight) diffusing section such as those described in U.S. Pat. Nos. 4,197,443 or 4,684,323. In these embodiments, diffusing section 114 can include first and second lobes 124 and 126 as described above. Alternatively, cooling hole 106 can include a diffusing section having three or more lobes such as those described in the U.S. Provisional Application No. 61/599,381, filed on Feb. 15, 2012 and entitled "MULTI-LOBED COOLING HOLE AND METHOD OF MANUFACTURE", and the U.S. Provisional Application No. 61/599,379, filed on Feb. 15, 2012 and entitled "MULTI-LOBED COOLING HOLE AND METHOD OF MANUFACTURE", which are incorporated by reference.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 8A:
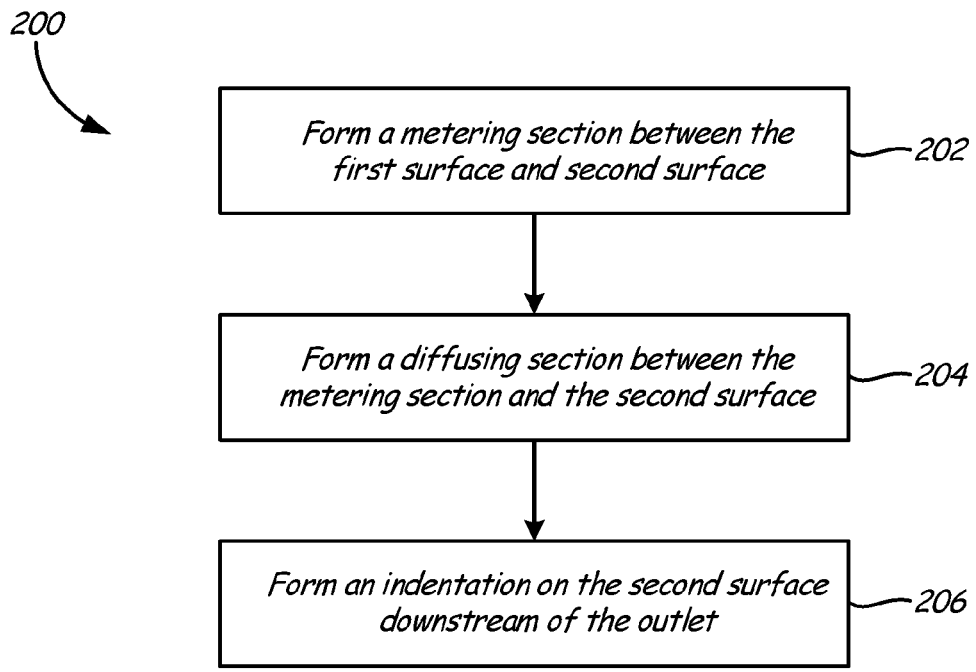
FIG. 8A is a simplified flow diagram illustrating one embodiment of a method for producing a cooling hole with enhanced flow attachment in a gas turbine engine wall.

FIG. 8A is a simplified flow diagram illustrating one embodiment of a method for producing a cooling hole in a gas turbine engine wall having inner and second surfaces. Method 200 includes forming a metering section between the inner and second surfaces (step 202), forming a diffusing section between the metering section and the second surface (step 204) and forming an indentation on the second surface downstream of the outlet (step 206). Metering section 112 is formed in step 202 by one or more of the casting, machining or drilling techniques described above. The technique(s) chosen is/are typically determined based on performance, reproducibility and cost. In embodiments where step 202 occurs prior to step 204, inlet 110 and portions of diffusing section 114 and outlet 116 can also be formed during formation of metering section 112. Diffusing section 114 is formed in step 204 by one or more of the casting, machining or drilling techniques described above. As with metering section 112, the technique(s) chosen is/are typically determined based on performance, reproducibility and cost. In embodiments where step 202 occurs prior to step 204, outlet 116 is fully formed during step 204. Once diffusing section 114 has been formed in step 204, indentation 108 is formed in step 206. Indentation 108 is formed on second wall surface 104 so that a distance between outlet 116 and indentation 108 on second wall surface 104 is less than a distance between the inner wall surface 102 and second wall surface 104.

Figure 8B:
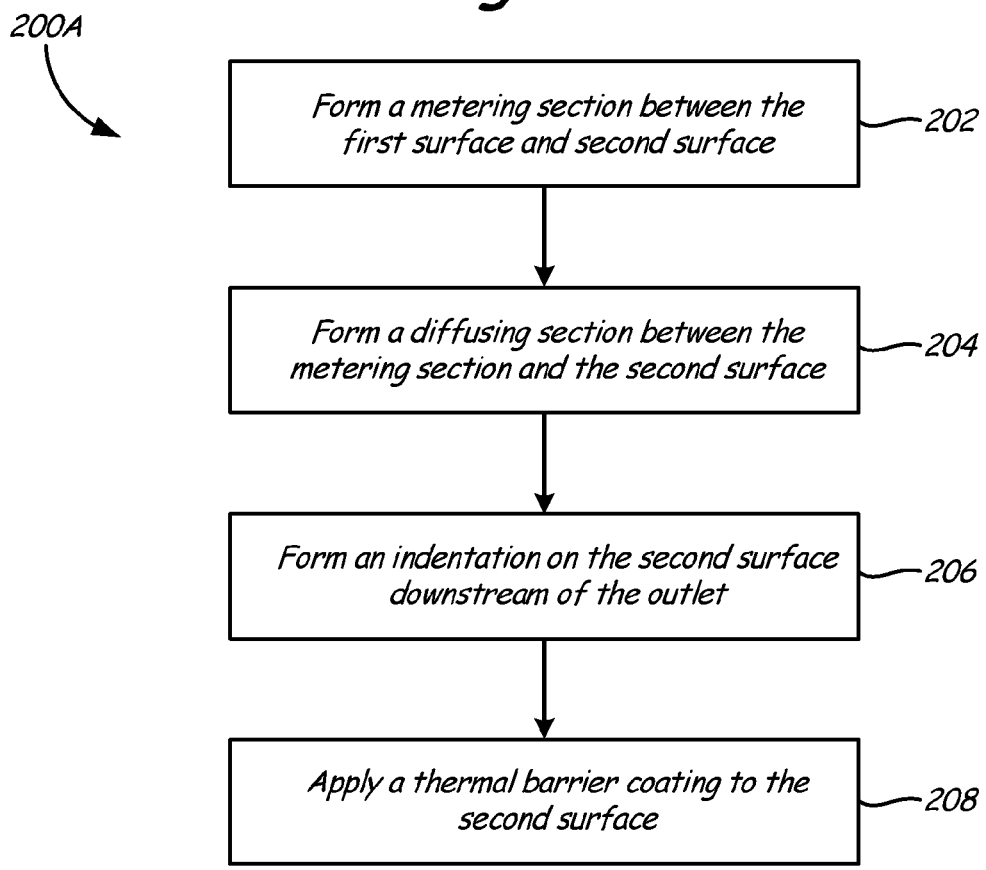
FIG. 8B is a simplified flow diagram illustrating another embodiment of a method for producing a cooling hole with enhanced flow attachment in a gas turbine engine wall.

Steps 202, 204 and 206 can be performed before or after an optional thermal barrier coating application. In optional step 208 (shown as a step in method 200A in FIG. 8B), a thermal barrier coating is applied to second wall surface 104. Application of the thermal barrier coating can also include the application of a bond coating prior to the thermal barrier coating. Steps 202, 204, 206 and 208 can be performed in any order depending on the location of cooling hole 106, the location of diffusing section 114 relative to the metallic wall and the thermal barrier coating and the location of crenellation features 128 within diffusing section 114. As previously stated, the order of steps 202, 204, 206 and 208 can affect the machining or drilling techniques chosen for steps 202, 204 and 206.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a wall having first and second wall surfaces, a cooling hole extending through the wall, and a convexity. The cooling hole can include an inlet located at the first wall surface, an outlet located at the second wall surface, a metering section extending downstream from the inlet and a diffusing section extending from the metering section to the outlet. The diffusing section can include a first lobe diverging longitudinally and laterally from the metering section and a second lobe adjacent the first lobe and diverging longitudinally and laterally from the metering section. The convexity can be located near the outlet.

The system of the preceding paragraph can optionally include, additionally and/or alternatively any, one or more of the following features, configurations and/or additional components:

the component can further include an indentation located downstream from the convexity on the second wall surface and downstream from the outlet;

the indentation can have a lateral width that is greater than or equal to a lateral width of the outlet;

the indentation can have a lateral width that is between about 100% and about 150% of the lateral width of the convexity;

the indentation can have a longitudinal length that is substantially equal to a longitudinal length of the convexity;

the diffusing section can further includes an interlobe region having a portion that extends between the first and second lobes, the interlobe region having an end adjacent the outlet;

the interlobe region can have a second portion located between the outlet and the first and second lobes;

the outlet can include a concave trailing edge and the indentation can be concave with respect to air flowing through the cooling hole;

the indentation can be convex with respect to air flowing through the cooling hole;

the indentation can have a circular arc extending towards the first wall surface;

the indentation can have an elliptical arc extending towards the first wall surface;

a distance between the indentation and the outlet on the second wall surface can be larger than a distance between the first and second wall surfaces;

the diffusing section can include a bottom surface, and the convexity can be formed by the bottom surface of the diffusing section and the second wall surface;

the component can further include a second indentation laterally parallel with the indentation;

the indentation can be located downstream from the first lobe and the second indentation can be located downstream from the second lobe;

the component can further include a second indentation located downstream from the indentation;

the component can further include 1) a convexity located between the metering section and the indentation, the diffusing section having a bottom surface, and the convexity is formed by the bottom surface of the diffusing section and the second wall surface; and 2) a second convexity located between the indentation and the second indentation, and the second convexity is formed by a downstream portion of the indentation and the second wall surface downstream from the indentation; and/or the indentation can be convex with respect to a fluid which flows through the outlet.

A wall of a component of a gas turbine engine can include first and second wall surfaces, an inlet located at the first wall surface, an outlet located at the second wall surface, a metering section commencing at the inlet and extending downstream from the inlet, a diffusing section extending from the metering section and terminating at the outlet and a convexity located on the second wall surface downstream of the outlet. The diffusing section can include a first lobe diverging longitudinally and laterally from the metering section and a second lobe adjacent the first lobe and diverging longitudinally and laterally from the metering section.

The system of the preceding paragraph can optionally include, additionally and/or alternatively any, one or more of the following features, configurations and/or additional components:

the wall can further include a concavity located downstream from the convexity on the second wall surface and downstream from the outlet; and/or the diffusing section can further include an interlobe region having a portion that extends between the first and second lobes, the interlobe region having an end adjacent the outlet.

The invention claimed is:

1. A gas turbine engine component comprising:
a wall having first and second wall surfaces;
a cooling hole extending through the wall and comprising:
an inlet located at the first wall surface;
an outlet located at the second wall surface;
a metering section extending downstream from the inlet and having a longitudinal axis; and
a diffusing section extending from the metering section to the outlet, the diffusing section comprising:
a first lobe diverging longitudinally and laterally from the metering section; and
a second lobe adjacent the first lobe and diverging longitudinally and laterally from the metering section; and
a convexity located near the outlet, wherein the convexity extends longitudinally from the first lobe to the second lobe and forms a curved surface on the second wall surface generally perpendicular to the longitudinal axis of the metering section such that the convexity is generally perpendicular to a flow direction of cooling air that flows through the cooling hole during use; and an indentation located on the second wall surface downstream from the convexity and downstream from the outlet, wherein the indentation is oriented such that it is one of either C-shaped or reverse C-shaped with respect to air flowing through the cooling hole.

2. The component of claim 1, wherein the indentation has a lateral width that is greater than or equal to a lateral width of the outlet.

3. The component of claim 1, wherein the indentation has a lateral width that is between about 100% and about 150% of the lateral width of the convexity.

4. The component of claim 1, wherein the indentation has a longitudinal length that is substantially equal to a longitudinal length of the convexity.

5. The component of claim 1, wherein the diffusing section further comprises:
an interlobe region having a portion that extends between the first and second lobes, the interlobe region having an end adjacent the outlet.

6. The component of claim 5, wherein the interlobe region has a second portion located between the outlet and the first and second lobes.

7. The component of claim 1, wherein the indentation has a circular arc extending towards the first wall surface.

8. The component of claim 1, wherein the indentation has an elliptical arc extending towards the first wall surface.

9. The component of claim 1, wherein a distance between the indentation and the outlet on the second wall surface is larger than a distance between the first and second wall surfaces.

10. The component of claim 1, wherein the diffusing section comprises a bottom surface, and wherein the convexity is formed along the bottom surface of the diffusing section and the second wall surface.

11. The component of claim 1, further comprising:
a second convexity.

12. The component of claim 11, wherein the convexity is located downstream from the first lobe and the second convexity is located downstream from the second lobe.

13. The component of claim 1, further comprising:
a second indentation located downstream from the indentation.

14. The component of claim 13, wherein the diffusing section comprises a bottom surface, and wherein the convexity is formed by the bottom surface of the diffusing section and the second wall surface; and the component further comprises:
a second convexity located between the indentation and the second indentation, wherein the second convexity is formed by a downstream portion of the indentation and the second wall surface downstream from the indentation.

15. A wall of a component of a gas turbine engine, the wall comprising:
first and second wall surfaces;
an inlet located at the first wall surface;
an outlet located at the second wall surface;
a metering section commencing at the inlet and extending downstream from the inlet and having a longitudinal axis;
a diffusing section extending from the metering section and terminating at the outlet, the diffusing section comprising:
a first lobe diverging longitudinally and laterally from the metering section; and
a second lobe adjacent the first lobe and diverging longitudinally and laterally from the metering section; and
a convexity located on the second wall surface downstream of the outlet, wherein the convexity extends laterally in a direction generally perpendicular to the longitudinal axis of the metering section such that the convexity is generally perpendicular with respect to a flow direction of air that flows through the cooling hole; and a concavity located downstream from the convexity on the second wall surface and downstream from the outlet, wherein the concavity is oriented such that it is one of either C-shaped or reverse C-shaped with respect to air flowing through the cooling hole.

16. The wall of claim 15, wherein the diffusing section further comprises:
an interlobe region having a portion that extends between the first and second lobes, the interlobe region having an end adjacent the outlet.

* * * * *